No. 671,361. Patented Apr. 2, 1901.
M. L. WHITEHEAD.
CATTLE GUARD.
(Application filed Jan. 10, 1901.)
(No Model.) 2 Sheets—Sheet 1.

Witnesses
Gladys L. Thompson

Inventor
Marmaduke L. Whitehead
By Lacey
Attorneys

No. 671,361. Patented Apr. 2, 1901.
M. L. WHITEHEAD.
CATTLE GUARD.
(Application filed Jan. 10, 1901.)
(No Model.) 2 Sheets—Sheet 2.
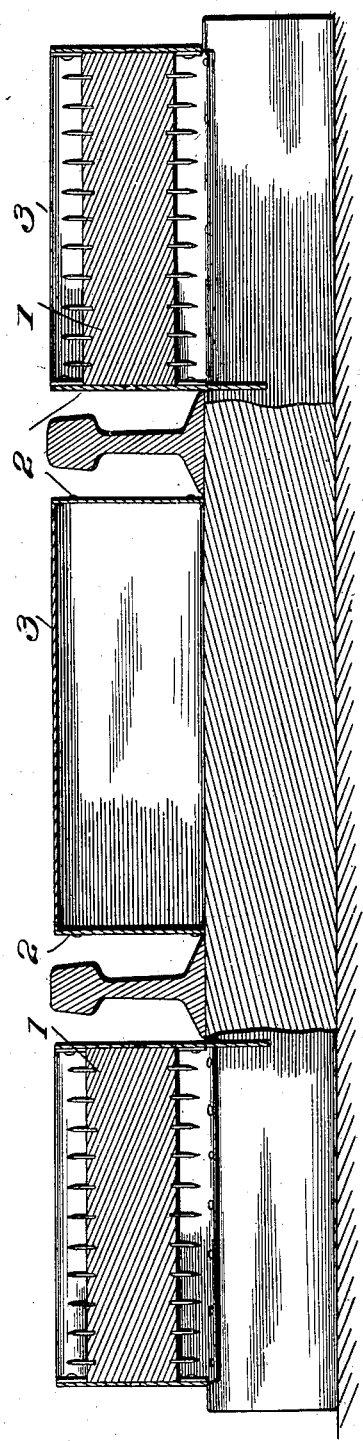
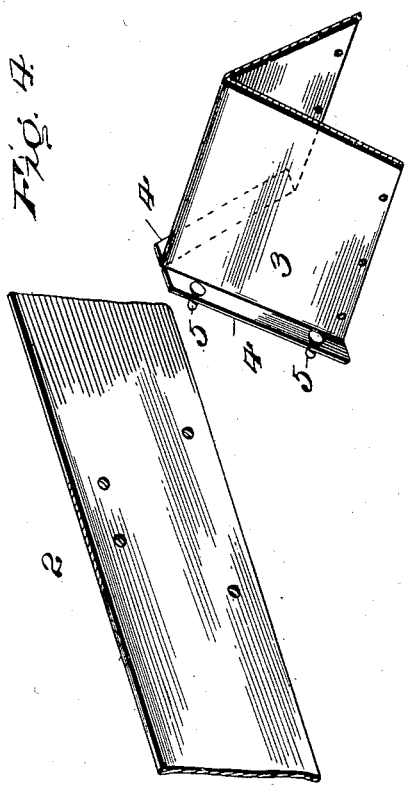
Witnesses
Inventor
Marmaduke L. Whitehead
By R. S. & A. B. Lacey, Attorneys

UNITED STATES PATENT OFFICE.

MARMADUKE L. WHITEHEAD, OF CHAPANOKE, NORTH CAROLINA.

CATTLE-GUARD.

SPECIFICATION forming part of Letters Patent No. 671,361, dated April 2, 1901.

Application filed January 10, 1901. Serial No. 42,784. (No model.)

*To all whom it may concern:*

Be it known that I, MARMADUKE L. WHITEHEAD, a citizen of the United States, residing at Chapanoke, in the county of Perquimans and State of North Carolina, have invented certain new and useful Improvements in Cattle-Guards; and I do hereby declare the following to be a full, clear, and exact description of the invention, such as will enable others skilled in the art to which it appertains to make and use the same.

This invention relates to means for preventing stock—such as horses, cows, and swine—from crossing a railroad-track or passing from one inclosure to another through the gap in the fence occasioned by the tracks traversing a farm or crossing a road.

The essential feature of the invention is a series of toothed or spiked rollers disposed in parallel relation to one another and located between and at the sides of the rails, the rollers preventing an animal from obtaining a sure footing and the teeth or spikes inflicting punishment, the two actions being simultaneous, thereby being effective as a barrier to prevent stock from trespassing upon another's land or passing beyond given bounds.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1:
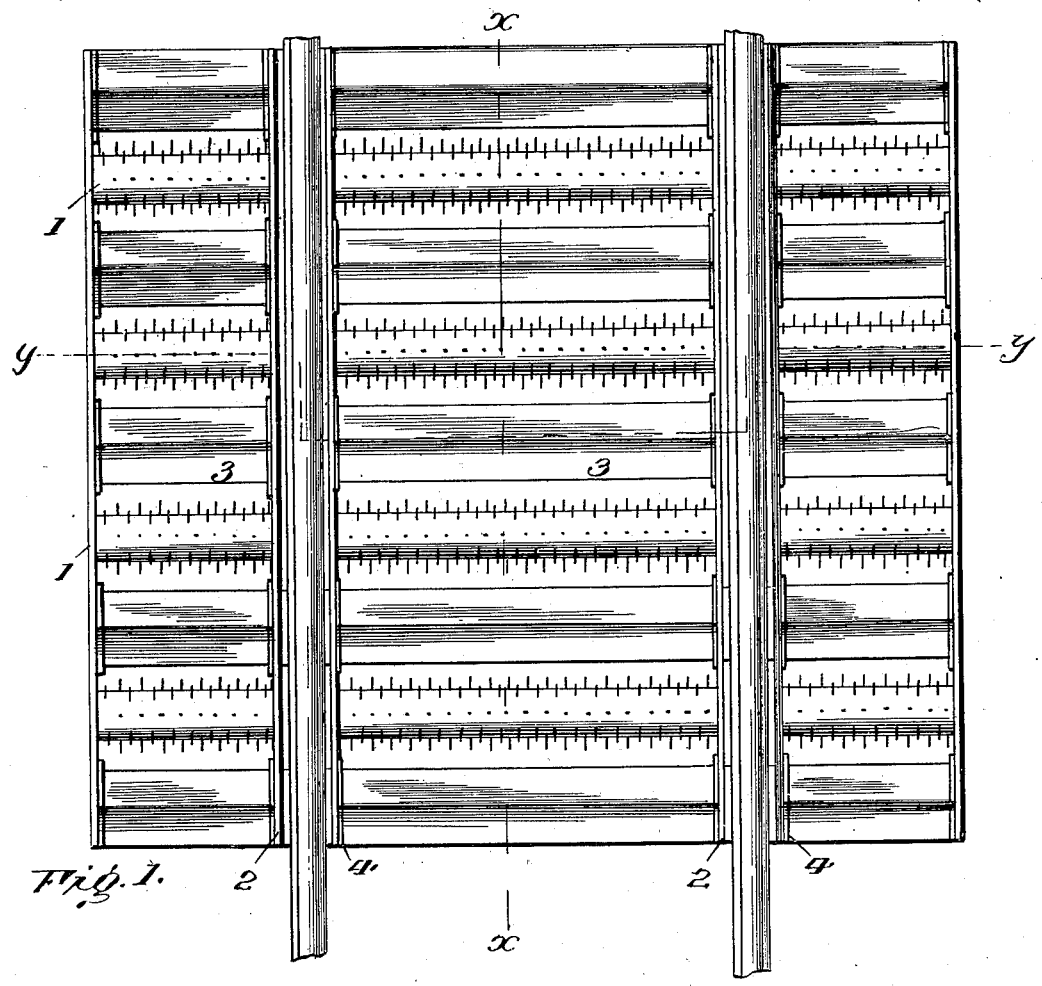
Figure 2:
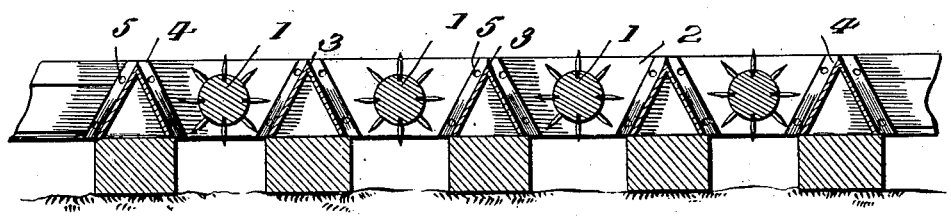

Figure 1 is a plan view of a cattle-guard embodying the invention. Fig. 2 is a section on the line X X of Fig. 1. Fig. 3 is a section on the line Y Y of Fig. 1. Fig. 4 is a perspective view of the end portion of one of the V-shaped bars alternating with the toothed rollers and a part of the adjacent plate.

Corresponding and like parts are referred to in the following description and indicated in all the views of the drawings by the same reference characters.

The guard comprises a series of toothed or spiked rollers 1, arranged in parallel relation to one another and located between and at the sides of the rails. The toothed rollers of each series are spaced apart and are mounted in any substantial manner, so as to turn freely upon the application of any weight or pressure to a side portion thereof. The teeth or spikes are sharpened so as to prick the animal and inflict punishment sufficient to prevent its advance after making an attempt to cross the track to pass from one inclosure to another along the track. The rollers may be of any length and diameter and may be constructed either of wood or metal. The middle rollers are longer than the rollers at the sides of the track and terminate close to the rails, so as to leave a minimum amount of space for an animal to obtain a footing when attempting to walk the rail, so as to clear the guard or interposed barrier. While the toothed rollers may be mounted in any convenient and substantial way, it is preferred to provide longitudinal strips or plates 2, having openings in transverse alinement to receive the journals of the rollers. A pair of strips or plates 2 is had for each series of rollers and the plates are connected intermediate of the rollers preferably by means of transverse bars 3, having their opposite sides sloping upwardly to an edge, so as to prevent an animal from obtaining proper footing thereon. The bars 3 and toothed rollers 1 are alternately arranged, and ample space is provided between their opposing sides to admit of the free passage of the foot of an animal, so that in the event of the foot passing between a roller and the adjacent bar it can be readily extracted without injury other than occasioned by the pricking or punishment inflicted by the teeth or spurs of the roller. The bars 3 are preferably formed of plates of metal folded intermediate of their longitudinal edges into approximately V shape, the ends being outwardly flanged, as shown at 4, and pierced to receive fastenings 5, by means of which they are secured to the strips or plates 2. By having the strips or plates 2 connected at intervals by means of the bars 3 they may be exceedingly light and comparatively thin metal may be used in their formation. When the guard is placed in position, it is secured by firm attachment either to the ties or sleepers, or to both.

Having thus described the invention, what is claimed as new is—

1. A cattle-guard comprising a series of rollers spaced apart, and a corresponding series of transverse bars located in the spaces formed between the rollers and having their sides upwardly sloping to an edge, substantially as set forth.

2. A cattle-guard comprising toothed or spiked rollers arranged parallel with one another and spaced apart, and V-shaped bars located in the spaces formed between adjacent rollers, substantially as set forth.

3. In a cattle-guard, longitudinal strips, transverse bars connecting the strips at intervals in their length, and toothed rollers journaled to the strips and located intermediate of the spaced bars, substantially as set forth.

4. In a cattle-guard, longitudinal strips, transverse bars of V shape having outer flanges at their ends secured to the longitudinal strips, and toothed rollers journaled to said strips and located intermediate of the bars, substantially as and for the purpose specified.

In testimony whereof I affix my signature in presence of two witnesses.

MARMADUKE L. WHITEHEAD. [L. S.]

Witnesses:
A. F. RIDDICK,
R. L. KNOWLES.